United States Patent [19]

Mori

[11] 4,078,479

[45] Mar. 14, 1978

[54] BURN-PROOF COOKING UTENSIL

[76] Inventor: Haruki Mori, 5-6 Shinjuku 2 chome, Shinjuku, Tokyo, Japan

[21] Appl. No.: 689,901

[22] Filed: May 25, 1976

[51] Int. Cl.² .......................................... A47J 37/10
[52] U.S. Cl. ..................................... 99/422; 99/447; D7/95
[58] Field of Search ................. 99/447, DIG. 15, 389, 99/401, 422, 425, 433, 446; 126/273, 373, 376, 390; 220/63, 66, 70; D7/45, 85, 87, 95, 125

[56] References Cited

U.S. PATENT DOCUMENTS

| 664,314 | 12/1900 | Corwin | 99/422 |
|---|---|---|---|
| 868,312 | 10/1907 | Wilcox | 99/433 |
| 1,460,380 | 7/1923 | Hughes | 99/425 |
| 1,718,668 | 6/1929 | Smythe | 99/DIG. 15 |
| 2,174,425 | 9/1939 | Schlumbohm | 126/390 X |
| 2,618,258 | 11/1952 | Kroyer | 99/422 X |
| 2,779,266 | 1/1957 | Trapani | 99/425 |

*Primary Examiner*—Harvey C. Hornsby
*Assistant Examiner*—Arthur O. Henderson
*Attorney, Agent, or Firm*—Oblon, Fisher, Spivak, McClelland & Maier

[57] ABSTRACT

Disclosed is a cooking utensil capable of cooking food without burning, which is characterized by the fact that the inner side of the bottom plate thereof contains a circular concave at the center thereof, radial rows of concaves disposed outside the circumference of said central circular concave and as many radial rows interposed one each between the adjacent ones of said first radial rows and each consisting of a circular concave and two convexes disposed opposite each other across said circular concave and the bottom side of said bottom plate contains convexes and concaves respectively at positions exactly corresponding to those of concaves and convexes on the inner side.

3 Claims, 2 Drawing Figures

BURN-PROOF COOKING UTENSIL

BACKGROUND OF THE INVENTION

This invention relates to a cooking utensil which is capable of cooking food without entailing the phenomenon of scorching.

Frying pans and other household cooking utensils of the prior art which have found the most popular acceptance are those having a flat bottom and measuring 24, 26 and 28 centimeters in diameter. When a given food is cooked with oil in a frying pan having such a flat bottom, there is frequently experienced the phenomenon of scorching or burning. This phenomenon occurs because the oil is not allowed to spread out smoothly and, as a result, some parts of the food suffer from a deficiency of oil and some other parts thereof are exposed to excessive heating.

To preclude this phenomenon of burning, therefore, it has been an inevitable practice for the user of the frying pan to lift the frying pan from the cooking fire time and again and toss the contents up in the air as for the purpose of turning them upside down. This handling of the frying pan calls for a special skill.

As an improved version of such flat-bottomed frying pan, there has recently been proposed a frying pan wherein the inner side of the bottom plate thereof is coated such as with a fluorine resin (Teflon, for example).

The coat of said fluorine resin eliminates the aforementioned disadvantages to some extent. Nevertheless, it inevitably has an adverse effect on the taste of the food cooked therein. It has another disadvantage in that the coat of fluorine resin tends to peel off and, therefore, requires the most careful handling.

After various studies in search of improvements in the conventional flat-bottomed frying pans, the inventors formerly made a discovery that a frying pan which has incorporated in the inner side of its bottom plate a circular concave at the center, concaves disposed radially relative to said central circular concave and each possessed of a shape of two circular recesses continuing into each other in the circumferential direction and a depth gradually decreasing in the direction from said central circular concave to the circumference of the bottom plate and coaxially annular convexes disposed between said central circular concave and the circumference causes a notable reduction in burning. Their invention based on this discovery was granted Japanese Utility Model Registration No. 883,870 dated Sept. 20, 1969.

This frying pan of their former improvement, however, has failed to provide perfect prevention of burning in particular types and methods of cooking. They have, therefore, continued further studies and have consequently accomplished the present invention.

The present invention can be advantageously applied not only to frying pans also to griddles and other cooking utensils having a heated surface of extensive area.

An object of the present invention is to provide a frying pan which is capable of frying any given food in a desired manner without entailing the phenomenon of burning.

Another object of the present invention is to provide a griddle which is capable of frying any given food in a desired manner without entailing the phenomenon of burning.

SUMMARY OF THE INVENTION

To accomplish the object described above, the frying pan of the present invention incorporates, in the bottom plate of an iron frying pan comprising a circular bottom plate possessed of a concave side and a convex side, a sloping side adapted to surround the periphery of said bottom plate and a handle attached to said sloping side, 1. a central circular concave measuring 35 to 45 millimeters in diameter and 1.2 to 1.7 millimeters in depth and disposed at the center,
2. at least three radial rows of concaves disposed in the direction from said central circular concave to the sloping side, said radial rows each comprising a plurality of circular concaves measuring 4 to 5 millimeters in diameter and 1.0 to 1.2 millimeters in depth and arranged in the direction from said center to the sloping side and a concave of the shape of a circle segment enclosed with a chord 20 to 25 millimeters in length and a corresponding arc and having a depth of 0.5 to 1.0 millimeter, said segmentary concave being disposed on the outermost side of said row, and
3. as many second radial rows disposed one each between adjacent ones of said first radial rows, said second radial rows each comprising a circular concave 8 to 15 millimeters in diameter and 1.2 to 1.5 millimeters in depth and two convexes disposed opposite each other across said circular concave in such a way that the convexes in all the radial rows fall on two concentric circumferences parallel to said sloping side and on the underside:
convexes and concaves disposed respectively at positions exactly corresponding to those of the concaves and convexes on said inner side.

The aforementioned ranges of diameters, depths, etc. of the concaves and convexes have been determined proportionately to the dimensions of the particular frying pan to be manufactured and, therefore, admit of variation to some extent.

The other advantages and features of the present invention will become apparent from the description to be given in further detail herein below with reference to the accompanying drawing.

The griddle in accordance with the present invention is characterized by being provided with concaves and convexes of the same type and arrangement as those of the above-described frying pan.

DESCRIPTION OF THE PREFERRED EMBODIMENTS

Figure 1:
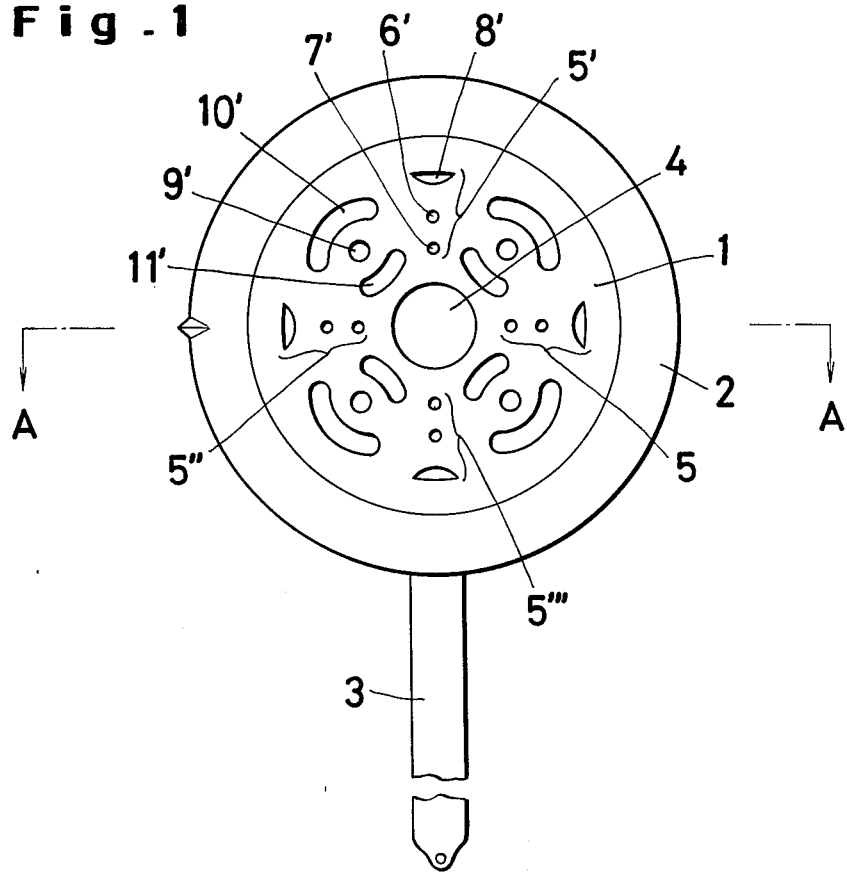
FIG. 1 is a plan view of a frying pan according to the present invention.

As a typical example of a cooking utensil to which the present invention is applicable, this invention will be described with reference to the typical embodiment of a frying pan in accordance with this invention shown in FIG. 1. In the drawing, 1 denotes a bottom plate of the frying pan, 2 a sloping side and 3 a handle. By 4 is denoted a central circular concave disposed at the center of said bottom plate 1. Denoted by 5, 5', 5" and 5'" are rows of concaves disposed radially from the center to the periphery of the frying pan. In the illustrated embodiment, there are disposed a total of four such radial rows of concaves.

The rows 5, 5', 5" and 5'" each comprise a plurality of circular concaves 6' and 7' (two such concaves in the illustration) and one concave 8' of the shape of a circle segment enclosed with a chord and a corresponding arc disposed on the outermost side of said row. As many radial rows are disposed one each between adjacent ones of the aforementioned radial rows of concaves, one as between the rows 5' and 5", for example. These radial rows each comprise a circular concave 9' disposed approximately in the middle and two convexes 10' and 11' are disposed opposite each other across said circular concave 9', one nearer the periphery and the other nearer the center respectively of the bottom plate. Most important for the present invention is the fact that when a given food is cooked in a frying pan, the frying pan should enable the oil to penetrate uniformly into the food. Thus, the present invention has issued from studies carried out with a view to determining the most efficient surface of contact between the food being cooked and the inner side of the frying pan. To be specific, this invention represents an improvement over the same inventors' previous invention which has been granted said Japanese Utility Model Registration No. 883,870.

By shaping the faces of the bottom plate of a frying pan in a construction as described above, the oil is always spread out throughout the entire inner face of the frying pan, with the result that the food being cooked does not come into direct contact with the frying pan. The frying pan of the present invention, therefore, obviates the necessity of frequently lifting the pan from the flame for the purpose of keeping the pan's contents from being scorched. The special skill needed by the user of the conventional flat-bottomed frying pan in precluding the phenomenon of scorching is no longer required. The frying pan is capable of cooking the food without entailing the possibility of the sizzling contents of the frying pan catching fire and causing a fire in the kitchen.

Before a given food is placed in this frying pan, a frying oil is received in the frying pan and caused to spread out throughout the entire inner face. In this case, said concaves disposed at various positions in the pan serve as oil reservoirs. Then the food is placed in the frying pan and heated over a flame. The oil is gradually volatilized and absorbed by the food. As the temperature rises, the oil held in the concaves quickly picks up fluidity and penetrates into the gaps formed between the inner face of the frying pan and the food being cooked. At no time at all throughout the entire period of cooking, is the food permitted to come into direct contact with the frying pan. The inner face of the frying pan other than the numerous concaves formed at the center and at various other parts consists of a flat surface and a few convexes. If the inner face of the frying pan is not provide with these convexes and only comprises said concaves and a flat surface, then the contact between the food being cooked and the frying pan is too intimate to permit smooth pentration of the oil. Because of the presence of said convexes, the oil is permitted to penetrate throughout the entire surface and the film of oil thus formed is not ruptured at all while the food is being heated, completely precluding the phenomenon of burning.

When the heating is discontinued, the oil is allowed chiefly to flow into the central circular concave 4. Thus the consumption of oil by the frying pan of this invention is small as compared with the conventional frying pans.

Further, the bottom-plate construction in the frying pan of this invention makes it possible to heat food to the center more quickly. This accelerated heating is conspicuous when the food being cooked is meat. As the cooking is terminated, the food thus cooked spontaneously floats up, rendering the separation of this cooked food from the frying pan extremely easy.

In the frying pan of the present invention, the effect aimed at is enhanced by having the shapes of various concaves formed therein defined as follows: The central circular concave to have 35 to 45 millimeters of diameter and 1.2 to 1.7 millimeters of depth, the circular concaves in the radial rows each to have 4 to 5 millimeters of diameter and 1.0 to 1.2 millimeters of depth, the concaves on the outermost sides of said radial rows each to have 20 to 25 millimeters of chord length and 0.5 to 1.0 millimeter of depth, the circular concaves intervening between said radial rows each to have 8 to 15 millimeters of diameter and 1.2 to 1.5 millimeters of depth and the convexes disposed opposite each other across said circular concaves each to have 0.1 to 0.2 millimeter in height.

The numerical values mentioned above are the optimum ones obtained from various experiments and are little affected by the dimensions of frying pan. The number of radial rows is required to be at least three and may be suitably determined by the area of the bottom plate of the frying pan. Similarly, the number of circular concaves in each radial row and the area of the each convex in the rows are also determined by the area of the bottom plate of frying pan. The effect aimed at by this invention is further enhanced when the sides defining said concaves and convexes are inclined to the extent of smoothening the flow of oil.

Figure 2:
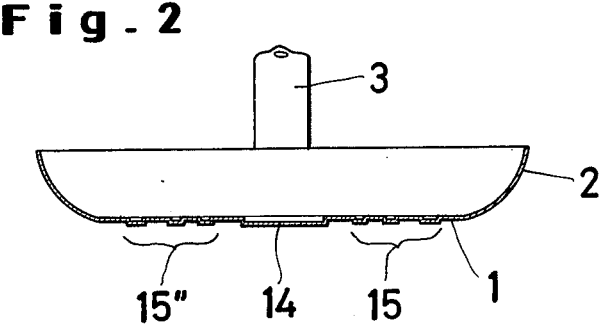
FIG. 2 is a cross section taken along the line A—A' of the diagram of FIG. 1.

FIG. 2 is a cross section taken along the line A—A' of FIG. 1, showing the fact that the concaves 4, 5 and 5" formed in the upper surface of the bottom plate of the frying pan, on the underside thereof, that is, on the lower surface of the bottom plate thereof, appear as convex portions corresponding to such concaves.

The frying pan of the present invention is made of iron to a uniform wall thickness throughout and the bottom side of the bottom plate contains convexes and concaves respectively at positions exactly corresponding to those of the concaves and convexes on the inner side thereof as already described above.

It has on numerous occasions occurred that a conventional flat-bottomed frying pan being used on a gas burner has slipped off the burner to spill its contents, and in some cases the accident has caused a kitchen fire. Because of its rugged bottom face, the frying pan of the present invention is almost perfectly safe from such danger. Further owing to the bottom-plate construction described above, possible loss of heat applied from below is small so that the frying pan enjoys efficient heating. The frying pan of this invention, therefore, provides higher thermal efficiency than the conventional flat-bottomed frying pan. The frying pan or other cooking utensil of this invention is further characterize by this feature.

To demonstrate the effect of the product of this invention, two iron-made frying pans 26 centimeters in diameter, 4.9 centimeters in depth and 1.6 millimeters in wall thickness were prepared. In accordance with the present invention, one of them contained a central circular concave (denoted by 4 in FIG. 1) 40 millimeters in diameter and 1.4 millimeters in depth, four radial rows each comprising two circular concaves 4.5 millimeters in diameter and 1.1 millimeters in depth and one segment enclosed with a chord 24 millimeters in length and a corresponding arc and having a depth of 0.8 millimeter and four second radial rows each comprising a convex (denoted by 9' in FIG. 1) 9 millimeters in diameter and 1.3 millimeters in depth and two patterned concaves (denoted by 10' and 11' in FIG. 1) 0.1 millimeter and 0.1 millimeters in height and 12 square centimeters and 6.3 square centimeters in area respectively. The other frying pan, which was of the conventional type, had a flat bottom plate. Various foods were cooked in these frying pans and compared.

(Results)

| Test No. | Kind of food prepared | Cooking conditions | Frying pan of this invention | Conventional frying pan having a flat bottom |
|---|---|---|---|---|
| 1 | Fried egg | Oil was applied in a thin film with cloth impregnated in advance with oil. | ⊚ | x |
| 2 | Hot cake | " | ⊚ | o |
| 3 | Chinese meat dumplings | Oil was applied in a thin film and the dumplings were steamed with water. | ⊚ | o |
| 4 | " | The dumplings were fried directly in the absence of oil film. | o | x |
| 5 | Pork saute | One large spoon full of oil was heated in advance and pork was placed on top. | ⊚ | o |
| 6 | Meat and vegetable saute | One large spoon full of oil was heated in advance and meat and vegetable were fried in the order mentioned. | ⊚ | o |

The cooked foods were rated on the three-mark scale, in which:
⊚ represents a cooked food which showed absolutely no sign of burning or adhesion to the inner face of frying pan and which was easily separated from the frying pan.
o represents a cooked food which showed signs of burning, though very slightly.
x represents a cooked food which showed signs of severe burning and which gave way when it was separated from the frying pan.

From the results given above, it is quite evident that the frying pan of the present invention produces neither burning nor adhesion in any sort of food and enjoys better properties than the conventional flat-bottomed frying pans.

An experiment conducted by the inventors indicates that the frying pan of the present invention permits about a 10% saving in the fuel consumption as compared with the conventional frying pans.

The material of the frying pan of this invention is limited to iron. However, when an iron frying pan in accordance with this invention is coated with nickel or some other plating metal which does not contaminate food, the effect thereof is not affected by the coating.

The frying pan is used quite advantageously when its wall thickness falls in the range of from 1.2 to 1.6 millimeters. The best effect is obtained when the wall thickness is 1.4 millimeters.

An iron griddle was further prepared to have the same concaves and convexes as the above-described frying pan. Pieces of beef fried on the griddle showed absolutely no sign of burning.

What is claimed is:

1. In a cooking utensil formed as a frying pan and comprising a circular bottom plate surrounded by a sidewall and provided with a handle, said bottom plate having concave portions and convex portions, an improvement of the bottom plate characterized by containing: on the upper side:
   a central circular concave measuring 35 to 45 millimeters in diameter and 1.2 to 1.7 millimeters in depth and disposed at the center,
   at least three radial rows of concaves disposed in the direction from said central circular concave to the periphery of said bottom plate, said radial rows each comprising a plurality of circular concaves measuring 4 to 5 millimeters in diameter and 1.0 to 1.2 millimeters in depth and arranged in the direction from said center to the periphery and a concave of the shape of a segment enclosed with a chord 20 to 25 millimeters in length and a corresponding arc and having a depth of 0.5 to 1.0 millimeter, said segmentary concave being disposed on the outermost end of said row, and
   a plurality of additional radial rows equal in number to said at least three radial rows and disposed one each between adjacent ones of said at least three radial rows, said plurality of additional radial rows each comprising a circular concave 8 to 15 millimeters in diameter and 1.2 to 1.5 millimeters in depth and two convexes disposed opposite each other across said circular concave in such a way that the convexes in all the radial rows fall on two concentric circumferences with respect to said central circular concave and on the underside:
   convexes and concaves disposed respectively at positions exactly corresponding to those of the concaves and convexes on said inner side.

2. The frying pan according to claim 1, wherein the surfaces are entirely coated with a metal plating.

3. The frying pan according to claim 1, wherein the wall thickness is from 1.2 to 1.6 millimeters.

* * * * *